(12) United States Patent
Trachtman (10) Patent No.: US 10,642,454 B1
(45) Date of Patent: May 5, 2020

(54) STORAGE MANAGEMENT SYSTEM AND METHOD

(71) Applicant: EMC CORPORATION, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 338 days.

(21) Appl. No.: 14/980,099

(22) Filed: Dec. 28, 2015

(51) Int. Cl.
*G06F 3/0484* (2013.01)
*H04L 29/08* (2006.01)

(52) U.S. Cl.
CPC ........ *G06F 3/0484* (2013.01); *H04L 67/1042* (2013.01)

(58) Field of Classification Search
None
See application file for complete search history.

(56) References Cited

U.S. PATENT DOCUMENTS

| | | | | |
|---|---|---|---|---|
| 2004/0199521 | A1* | 10/2004 | Anglin | G06F 17/30067 |
| 2009/0265353 | A1* | 10/2009 | Vaddagiri | G06F 21/6218 |
| 2011/0191485 | A1* | 8/2011 | Umbehocker | G06F 21/604 |
| | | | | 709/229 |
| 2013/0159637 | A1* | 6/2013 | Forgette | G06F 3/0605 |
| | | | | 711/154 |

\* cited by examiner

*Primary Examiner* — Tuan S Nguyen
(74) *Attorney, Agent, or Firm* — Brian J. Colandreo; Mark H. Whittenberger; Holland & Knight LLP (57) ABSTRACT

A method, computer program product, and computing system for defining a first object within a computer-based system using a first user interface. The first object is associated with the first user interface. A second object is defined within the computer-based system using a second user interface. The second object is associated with the second user interface.

20 Claims, 4 Drawing Sheets

STORAGE MANAGEMENT SYSTEM AND METHOD

TECHNICAL FIELD

This disclosure relates to storage systems and, more particularly, to systems and methods for managing data.

BACKGROUND

Storing and safeguarding electronic content is of paramount importance in modern business. Accordingly, large storage systems may be utilized to protect such electronic content. As would be expected, such large storage systems may be complex in nature and may have multiple users/administrators that are creating and deleting objects within these large storage systems. Unfortunately, such use and administration of these large storage systems by multiple users and administrators may result in complications concerning the management of these objects.

SUMMARY OF DISCLOSURE

In one implementation, a computer-implemented method is executed on a computing device and includes defining a first object within a computer-based system using a first user interface. The first object is associated with the first user interface. A second object is defined within the computer-based system using a second user interface. The second object is associated with the second user interface.

One or more of the following features may be included. The first object may be a first storage object and the second object may be a second storage object. Management of the first object may be enabled via the first user interface. The management of the first object may be discouraged via the second user interface. Management of the second object may be enabled via the second user interface. Management of the second object may be discouraged via the first user interface. A superuser may be enabled to manage the first object via the second user interface and the second object via the first user interface. A user may be enabled to change an association of the first object from the first user interface to the second user interface. The computer-based system may include a storage system. The computer-based system may include a virtual machine management system. The computer-based system may include a network management system.

In another implementation, a computer program product resides on a computer readable medium and has a plurality of instructions stored on it. When executed by a processor, the instructions cause the processor to perform operations including defining a first object within a computer-based system using a first user interface. The first object is associated with the first user interface. A second object is defined within the computer-based system using a second user interface. The second object is associated with the second user interface.

One or more of the following features may be included. The first object may be a first storage object and the second object may be a second storage object. Management of the first object may be enabled via the first user interface. The management of the first object may be discouraged via the second user interface. Management of the second object may be enabled via the second user interface. Management of the second object may be discouraged via the first user interface. A superuser may be enabled to manage the first object via the second user interface and the second object via the first user interface. A user may be enabled to change an association of the first object from the first user interface to the second user interface. The computer-based system may include a storage system. The computer-based system may include a virtual machine management system. The computer-based system may include a network management system.

In another implementation, a computing system including a processor and memory is configured to perform operations including defining a first object within a computer-based system using a first user interface. The first object is associated with the first user interface. A second object is defined within the computer-based system using a second user interface. The second object is associated with the second user interface.

One or more of the following features may be included. The first object may be a first storage object and the second object may be a second storage object. Management of the first object may be enabled via the first user interface. The management of the first object may be discouraged via the second user interface. Management of the second object may be enabled via the second user interface. Management of the second object may be discouraged via the first user interface. A superuser may be enabled to manage the first object via the second user interface and the second object via the first user interface. A user may be enabled to change an association of the first object from the first user interface to the second user interface. The computer-based system may include a storage system. The computer-based system may include a virtual machine management system. The computer-based system may include a network management system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
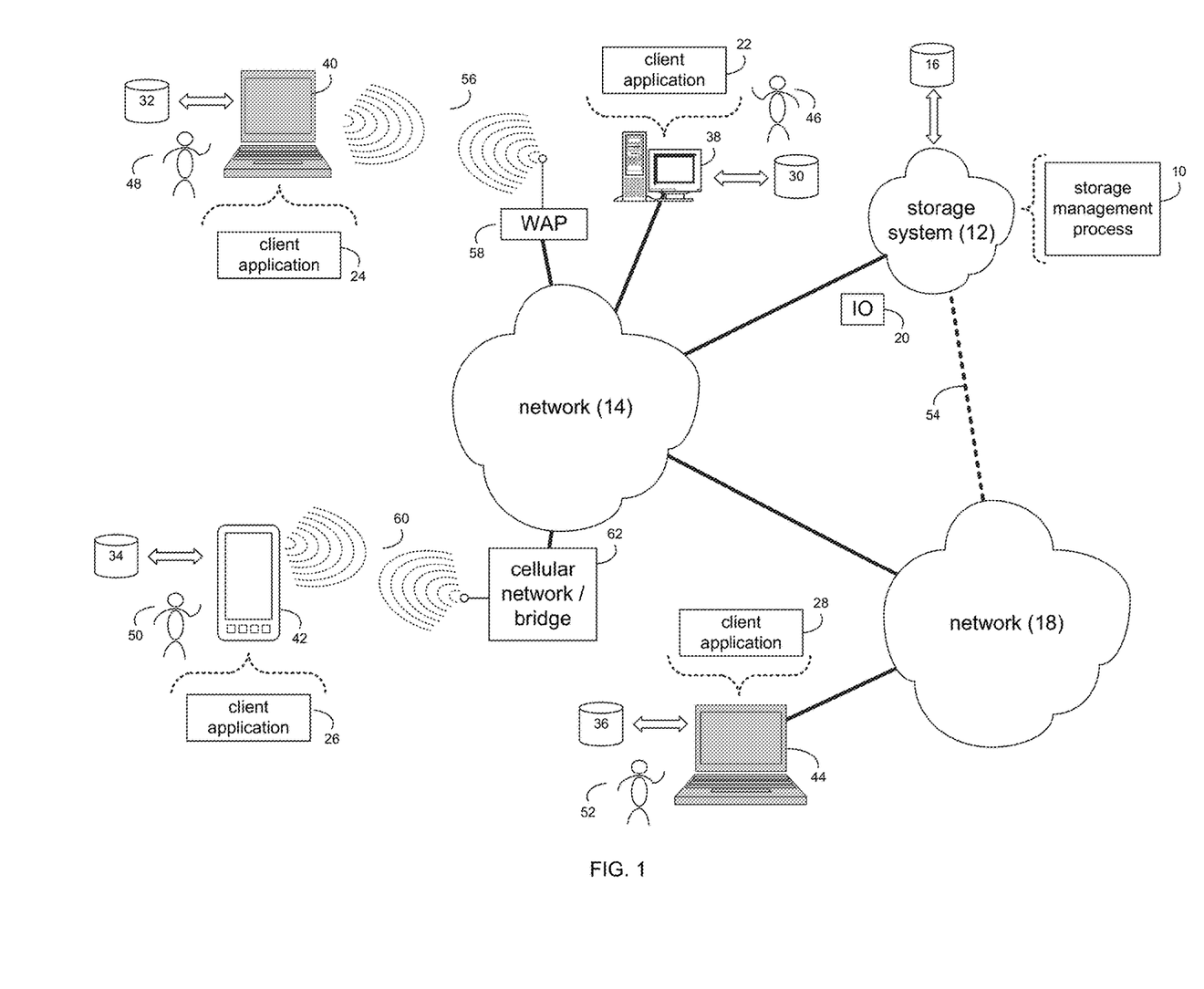
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix™, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
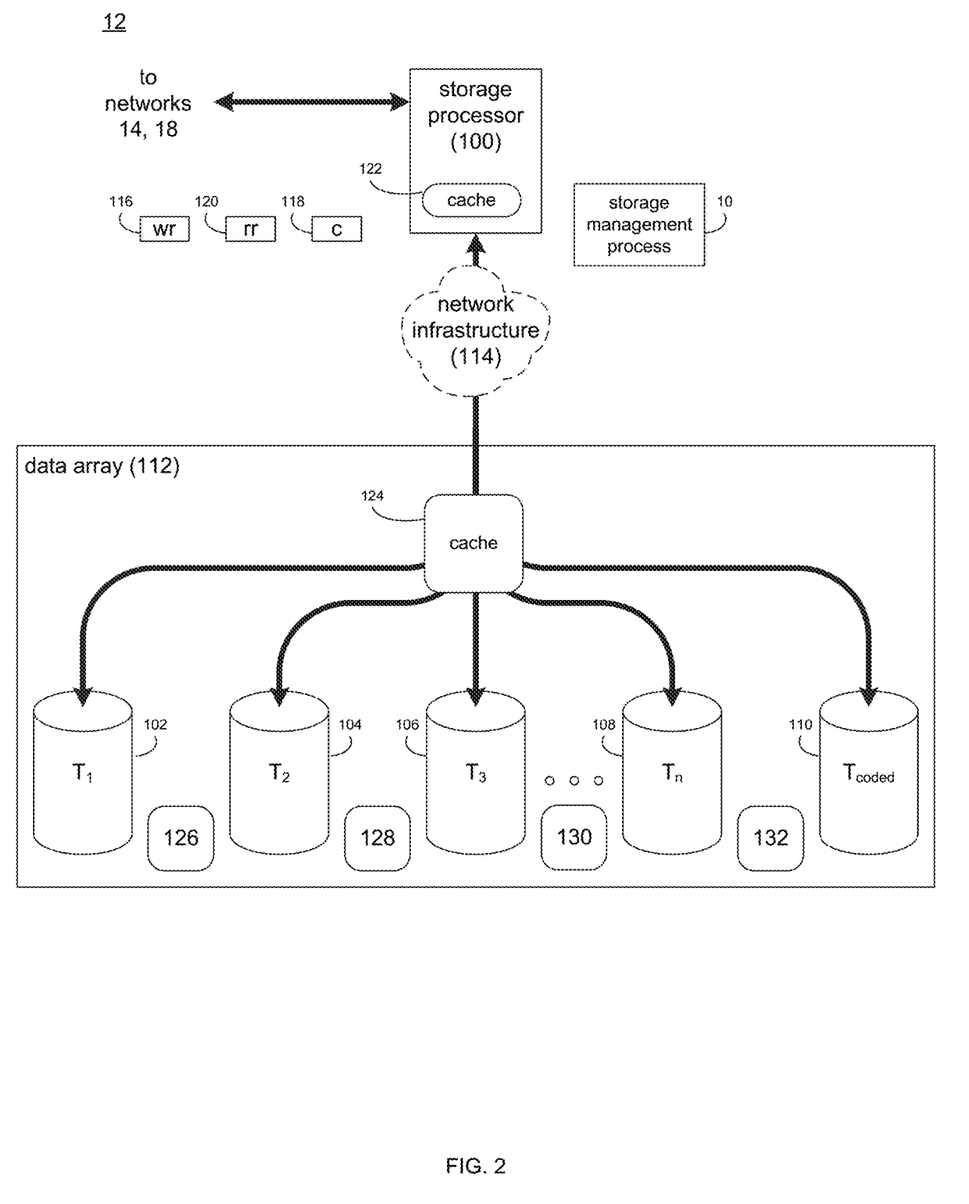
FIG. 2 is a diagrammatic view of the storage system of FIG. 1.

Referring also to FIG. 2, storage system 12 may include storage processor 100 and a plurality of storage targets T i-n (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

During operation of storage processor 100, content 118 to be written to storage system 12 may be received by storage processor 100. Additionally/alternatively and when storage processor 100 is configured as an application server, content 118 to be written to storage system 12 may be internally generated by storage processor 100.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

Additionally, assume that data array 112 defines and exposes Logical Units (e.g., LUNs 126, 128) that may allow for the storage of data within data array 112.

The Storage Management Process:

As will be discussed below in greater detail, storage management process 10 may be configured to implement procedures/rules that ease in the management of objects within computer-based systems. One example of such a computer-based system may include but is not limited to a storage system (e.g., storage system 12). Other examples of such a computer-based system may include but are not limited to: a virtual-machine management system; and a network management system.

Examples of such objects (within the data storage space) may include but are not limited to various storage objects, such as data files, data folders, data directories, LUNs, virtual disks, etc. Other examples of such objects (outside of the data storage space) may include but are not limited to computer resources, cloud resources, network resources, virtual machines, virtual networks, and/or any other type of "object" that may be created and managed within a computer-based system via a user interface.

Assume for the following example that storage management process 10 (in this implementation) is being used to manage objects within storage system 12. Further assume for illustrative purposes that user 46 is working on a project that requires user 46 to manipulate objects (e.g., add objects, delete objects and/or modify objects) within storage system 12, wherein user 46 may access storage system 12 via client application 22 and personal computer 38. Further assume for illustrative purposes that user 48 is working on a project that requires user 48 to manipulate objects (e.g., add objects, delete objects and/or modify objects) within storage system 12, wherein user 48 may access storage system 12 via client application 24 and laptop computer 40. Additionally, assume that user 52 is a supervisor of users 46, 48, wherein user 52 may access storage system 12 via client application 28 and notebook computer 44.

Assume that the project that user 46 is working on and the project that user 48 is working on is the same project and, therefore, users 46, 48 (and "supervising" user 52) access the same portions of storage system 12.

Figure 3:
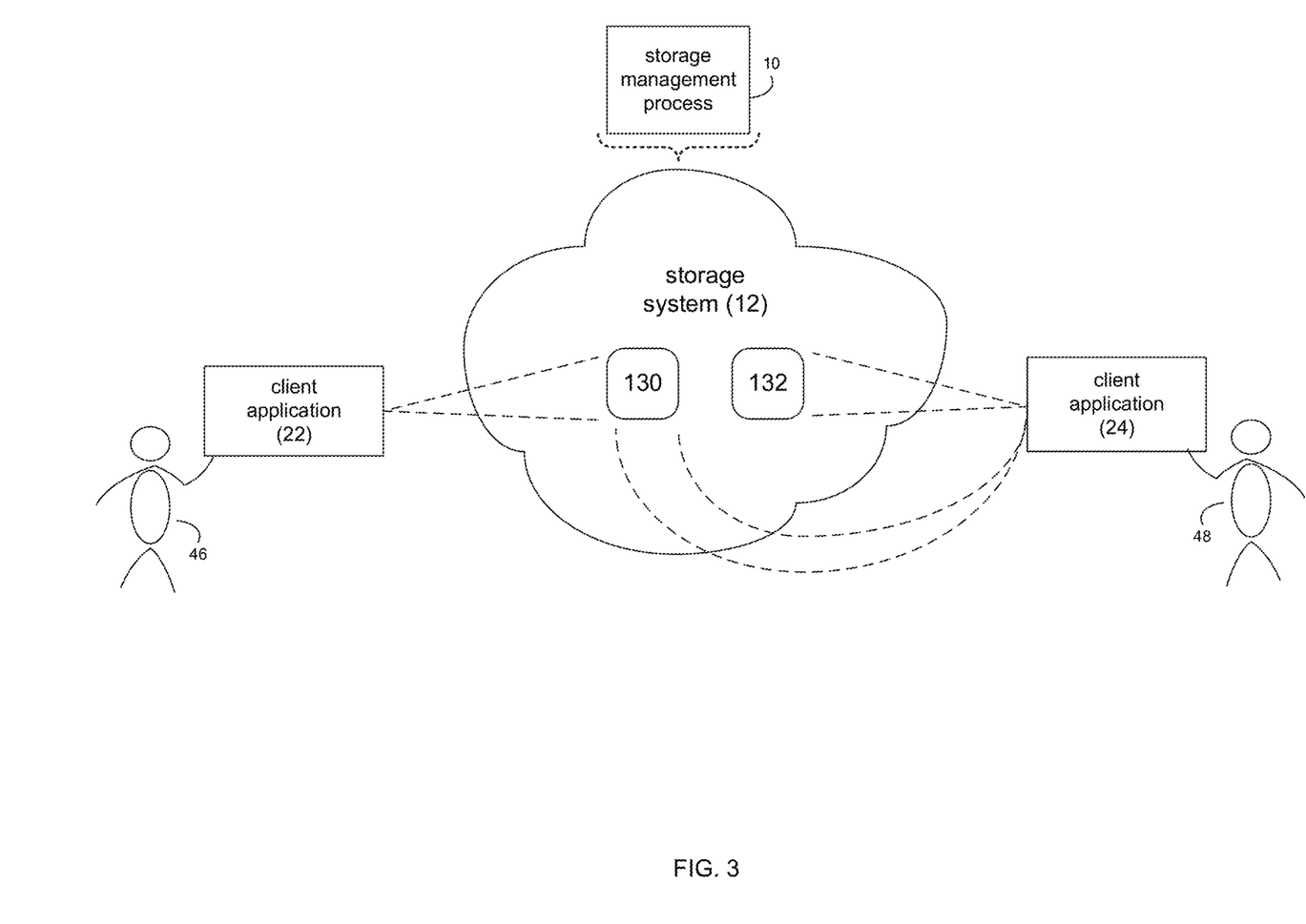
FIG. 3 is another diagrammatic view of the distributed computing network and storage system of FIG. 1.
Figure 4:
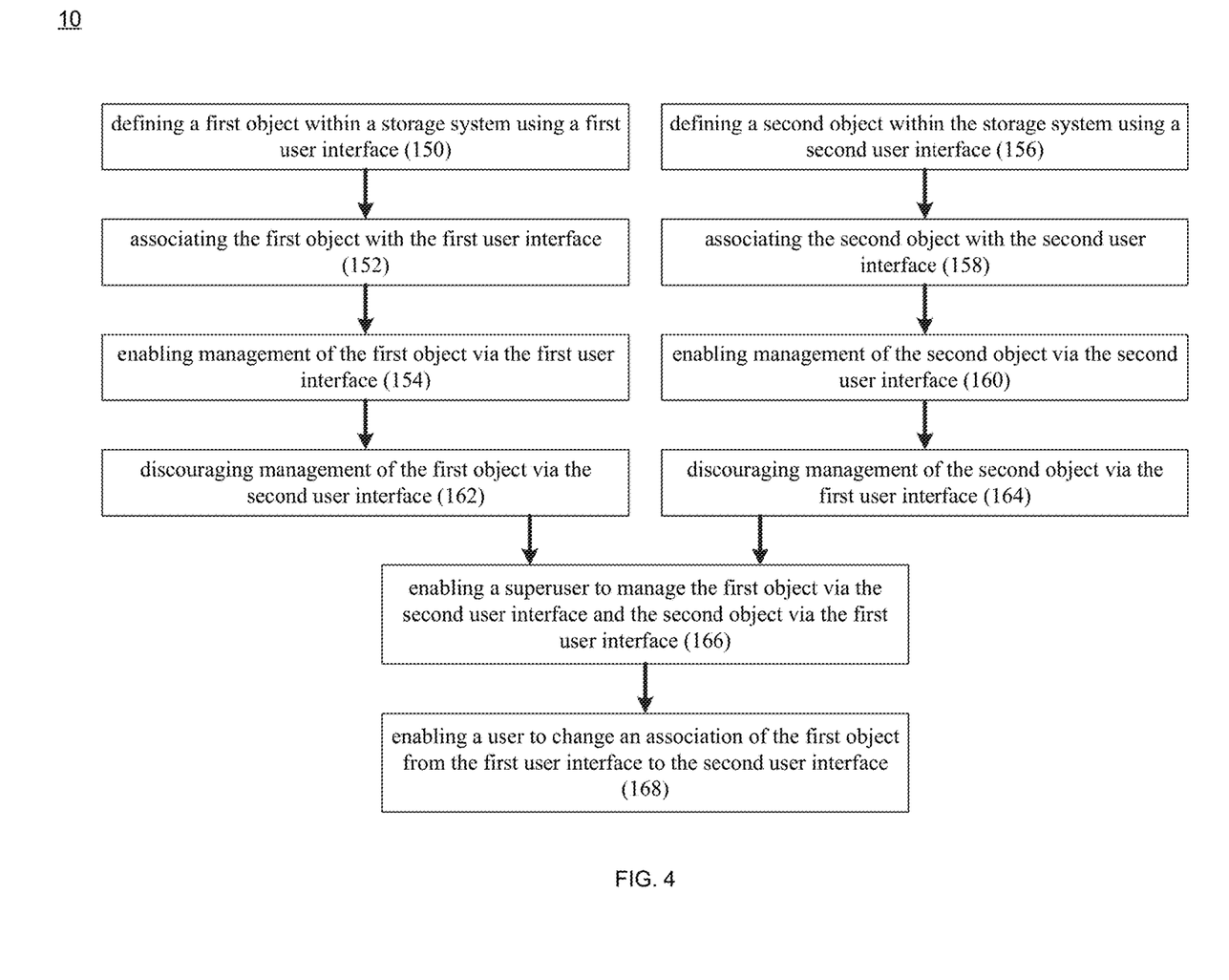
FIG. 4 is a flow chart of the storage management process of FIG. 1.

Referring also to FIGS. 3-4, storage management process 10 may be configured to define 150 a first object within a computer-based system (e.g., storage system 12) using a first user interface. For example, assume that user 46 needs a new LUN created for use with their project. Accordingly, user 46 may use a first user interface (e.g., client application 22) to access storage management process 10 so that storage management process 10 may define 150 a first object (e.g., LUN 130) within storage system 12. Storage management process 10 may then associate 152 the first object (e.g., LUN 130) with the first user interface (e.g., client application 22), thus enabling 154 management of the first object (e.g., LUN 130) via the first user interface (e.g., client application 22).

Storage management process 10 may define 156 a second object within a computer-based system (e.g., storage system 12) using a second user interface. For example, assume that user 48 needs a new LUN created for use with their project. Accordingly, user 48 may use a second user interface (e.g., client application 24) to access storage management process 10 so that storage management process 10 may define 156 a second object (e.g., LUN 132) within storage system 12. Storage management process 10 may then associate 158 the second object (e.g., LUN 132) with the second user interface (e.g., client application 24), thus enabling 160 management of the second object (e.g., LUN 132) via the second user interface (e.g., client application 24).

For this example, assume that client application 22 (i.e., the first user interface) is a user interface that is associated with a first system/methodology that is used to access & manage storage system 12; wherein an example of such a system/methodology includes but is not limited to the user interface for VMware™, a product offered by VMWare™ of Palo Alto, Calif.

Accordingly and when defining 150 LUN 130 within storage system 12 using a first user interface (e.g., client application 22) for a first system/methodology (e.g., VMware™), LUN 130 may be defined in a manner such that LUN 130 may only be efficiently managed using the first user interface (e.g., client application 22). For example, the first system/methodology (e.g., VMware™) may include certain features that allow LUN 130 to be configured in a manner that is unique to the first system/methodology (e.g., VMware™). Accordingly, storage management process 10 may associate 152 the first object (e.g., LUN 130) with the first user interface (e.g., client application 22), thus enabling 154 management of the first object (e.g., LUN 130) via the first user interface (e.g., client application 22).

Additionally, storage management process 10 may discourage 162 management of the first object (e.g., LUN 130) via other user interfaces (namely, user interfaces that are not associated with the first system/methodology (e.g., VMware™), as these other user interfaces that are associated with other systems/methodologies for accessing storage system 12 may not be capable of efficiently managing LUN 130. Examples of storage management process 10 discouraging 162 management of LUN 130 may include but are not limited to: a) prohibiting the other user interfaces (namely, user interfaces that are not associated with the first system/methodology (e.g., VMware™) from being able to manage (or see) LUN 130, or b) requiring approval/authorization before any other user interfaces (namely, user interfaces that are not associated with the first system/methodology (e.g., VMware™) are able to manage LUN 130.

Also assume for this example that client application 24 (i.e., the second user interface) is a user interface that is associated with another system/methodology that is used to access & manage storage system 12; wherein an example of such a system/methodology includes but is not limited to the user interface for VPLEX™, a product offered by EMC Corporation™ of Hopkinton, Mass.

Accordingly and when defining 156 LUN 132 within storage system 12 using a second user interface (e.g., client application 24) for a second system/methodology (e.g., VPLEX™), LUN 132 may be defined in a manner such that LUN 132 may only be efficiently managed using the second user interface (e.g., client application 24). For example, the second system/methodology (e.g., VPLEX™) may include certain features that allow LUN 132 to be configured in a manner that is unique to the second system/methodology (e.g., VPLEX™). Accordingly, storage management process 10 may associate 158 the second object (e.g., LUN 132) with the second user interface (e.g., client application 24), thus enabling 160 management of the second object (e.g., LUN 132) via the second user interface (e.g., client application 24).

Additionally, storage management process 10 may discourage 164 management of the second object (e.g., LUN 132) via other user interfaces (namely, user interfaces that are not associated with the second system/methodology (e.g., VPLEX™), as these other user interfaces that are associated with other systems/methodologies for accessing storage system 12 may not be capable of efficiently managing LUN 132. Examples of storage management process 10 discouraging 164 management of LUN 132 may include but are not limited to: a) prohibiting the other user interfaces (namely, user interfaces that are not associated with the second system/methodology (e.g., VPLEX™) from being able to manage (or see) LUN 132, or b) requiring approval/authorization before any other user interfaces (namely, user interfaces that are not associated with the second system/methodology (e.g., VPLEX™) are able to manage LUN 132.

Accordingly, storage management process 10 may enable 154 management of the first object (e.g., LUN 130) via the first user interface (e.g., client application 22) and may discourage 162 management of the first object (e.g., LUN 130) via other user interfaces, including but not limited to (in this example) the second user interface (e.g., client application 24).

Further, storage management process 10 may enable 160 management of the second object (e.g., LUN 132) via the second user interface (e.g., client application 24) and may discourage 164 management of the second object (e.g., LUN 132) via other user interfaces, including but not limited to (in this example) the first user interface (e.g., client application 22).

As discussed above, user 52 is a supervisor of users 46, 48, wherein user 52 may access storage system 12 via client application 28 and notebook computer 44. Accordingly, storage management process 10 may enable 166 a superuser (e.g., such as a supervisor or a manager) to manage the first object (e.g., LUN 130) via the second user interface (e.g., client application 24) and the second object (e.g., LUN 132) via the first user interface (e.g., client application 22). Specifically, storage management process 10 may enable 166 user 52 to manage any objects using any user interface. For example, assume that user 52 uses a cross-platform user interface that allows for management of objects created using various different user interfaces for various systems/methodologies. An example of such a cross-platform user interface includes but is not limited to the ViPR™ system, a product offered by EMC Corporation™ of Hopkinton, Mass. Accordingly, storage management process 10 may enable 166 user 52 to manage any objects using such a cross-platform user interface.

As projects, roles and obligations often change, it may be desirable to have an object that is currently associated with (and being managed by) one user interface to be associated with (and managed by) another user interface. Accordingly, storage management process 10 may be configured to enable 168 a user to change an association of an object from one user interface to another user interface. For example, if it is desirable to change the association of LUN 130, storage management process 10 may be configured to enable 168 user 46 to change the association of LUN 130 (e.g., the first object) from the first user interface (e.g., client application 22) to the second user interface (e.g., client application 24).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    defining a first object within a computer-based system using a first client application user interface associated with a first storage system platform methodology used to access the computer-based system, wherein the first object is uniquely defined for management by the first client application user interface associated with the first storage system platform methodology used to access the computer-based system;
    associating the first object with the first client application user interface;
    defining a second object within the computer-based system using a second client application user interface associated with a second storage system platform methodology used to access the computer-based system, wherein the second object is uniquely defined for management by the second client application user interface associated with the second storage system platform methodology used to access the computer-based system, wherein the first storage system platform methodology is different than the second storage system platform methodology, and wherein the second client application user interface is a different application type than the first client application user interface;
    associating the second object with the second client application user interface;
    enabling management of the first object via the first client application user interface based upon, at least in part, the first client application user interface being associated with the first storage system platform methodology; and
    discouraging management of the first object via the second client application user interface based upon, at least in part, the second client application user interface not being associated with the first storage system platform methodology, wherein discouraging management of the first object via the second client application user interface includes prohibiting at least the second client application user interface, not being associated with the first storage system platform methodology, from being able to manage the first object.

2. The computer-implemented method of claim 1 wherein the first object is a first storage object and the second object is a second storage object.

3. The computer-implemented method of claim 1 further comprising:
    enabling management of the second object via the second client application user interface.

4. The computer-implemented method of claim 3 further comprising:
    discouraging management of the second object via the first client application user interface.

5. The computer-implemented method of claim 1 further comprising:
    enabling a superuser to manage the first object via the second client application user interface and the second object via the first client application user interface.

6. The computer-implemented method of claim 1 further comprising:
    enabling a user to change an association of the first object from the first client application user interface to the second client application user interface.

7. The computer-implemented method of claim 1 wherein the computer-based system includes a storage system.

8. The computer-implemented method of claim 1 wherein the computer-based system includes a virtual machine management system.

9. The computer-implemented method of claim 1 wherein the computer-based system includes a network management system.

10. The computer-implemented method of claim 1 wherein discouraging management of the first object via the second client application user interface includes requiring approval before at least the second client application user interface, not being associated with the first storage system platform methodology, is able to manage the first object.

11. A computer program product residing on a non-transitory computer readable medium having a plurality of instructions stored thereon which, when executed by a processor, cause the processor to perform operations comprising:
    defining a first object within a computer-based system using a first client application user interface associated with a first storage system platform methodology used to access the computer-based system, wherein the first object is uniquely defined for management by the first client application user interface associated with the first storage system platform methodology used to access the computer-based system;
    associating the first object with the first client application user interface;
    defining a second object within the computer-based system using a second client application user interface associated with a second storage system platform methodology used to access the computer-based system, wherein the second object is uniquely defined for management by the second client application user interface associated with the second storage system platform methodology used to access the computer-based system, wherein the first storage system platform methodology is different than the second storage system platform methodology, and wherein the second client application user interface is a different application type than the first client application user interface;
    associating the second object with the second client application user interface;
    enabling management of the first object via the first client application user interface based upon, at least in part, the first client application user interface being associated with the first storage system platform methodology;
    discouraging management of the first object via the second client application user interface based upon, at least in part, the second client application user interface not being associated with the first storage system platform methodology, wherein discouraging management of the first object via the second client application user interface includes prohibiting at least the second client application user interface, not being associated with the first storage system platform methodology, from being able to manage the first object.

12. The computer program product of claim 11 wherein the first object is a first storage object and the second object is a second storage object.

13. The computer program product of claim 11 further comprising instructions for:
enabling management of the second object via the second client application user interface; and
discouraging management of the second object via the first client application user interface.

14. The computer program product of claim 11 further comprising instructions for:
enabling a superuser to manage the first object via the second client application user interface and the second object via the first client application user interface.

15. The computer program product of claim 11 further comprising instructions for:
enabling a user to change an association of the first object from the first client application user interface to the second client application user interface.

16. The computer program product of claim 11 wherein the computer-based system includes one or more of:
a storage system;
a virtual machine management system; and
a network management system.

17. The computer program product of claim 11 wherein discouraging management of the first object via the second client application user interface includes requiring approval before at least the second client application user interface, not being associated with the first storage system platform methodology, is able to manage the first object.

18. A computing system including a processor and memory configured to perform operations comprising:
defining a first object within a computer-based system using a first client application user interface associated with a first storage system platform methodology used to access the computer-based system, wherein the first object is uniquely defined for management by the first client application user interface associated with the first storage system platform methodology used to access the computer-based system;
associating the first object with the first client application user interface;
defining a second object within the computer-based system using a second client application user interface associated with a second storage system platform methodology used to access the computer-based system, wherein the second object is uniquely defined for management by the second client application user interface associated with the second storage system platform methodology used to access the computer-based system, wherein the first storage system platform methodology is different than the second storage system platform methodology, and wherein the second client application user interface is a different application type than the first client application user interface;
associating the second object with the second client application user interface;
enabling management of the first object via the first client application user interface based upon, at least in part, the first client application user interface being associated with the first storage system platform methodology; and
discouraging management of the first object via the second client application user interface based upon, at least in part, the second client application user interface not being associated with the first storage system platform methodology, wherein discouraging management of the first object via the second client application user interface includes prohibiting at least the second client application user interface, not being associated with the first storage system platform methodology, from being able to manage the first object.

19. The computing system of claim 18 further configured to perform operations comprising:
enabling management of the second object via the second client application user interface;
discouraging management of the second object via the first client application user interface; and
enabling a user to change an association of the first object from the first client application user interface to the second client application user interface.

20. The computing system of claim 18 wherein discouraging management of the first object via the second client application user interface includes requiring approval before at least the second client application user interface, not being associated with the first storage system platform methodology, is able to manage the first object.

* * * * *